UNDERWATER ELECTROSONIC COMMUNICATION SYSTEMS AND APPARATUS

Filed May 16, 1967

INVENTORS

BY

Sidney Epstein
David Epstein

INVENTORS

BY [signatures]

INVENTOR.

BY

United States Patent Office 3,451,039
Patented June 17, 1969

3,451,039
UNDERWATER ELECTROSONIC COMMUNICATION SYSTEMS AND APPARATUS

Sidney Epstein and David Epstein, Brooklyn, N.Y., assignors to Vadys Associates, Ltd., Brooklyn, N.Y., a corporation of New York Filed May 16, 1967, Ser. No. 638,797
Int. Cl. H04b 13/00
U.S. Cl. 340—5 4 Claims

ABSTRACT OF THE DISCLOSURE

Underwater communication system employing a pair of discrete one way communication channels with automatic maintenance of mutual station alignment being effected by continuous complemental receiver tracking of the transmitted carriers which are directionally slaved to companion receivers. Also included is the utilization of monopulse location techniques with a pair of time shared and/or continuous wave directional beacons with superposition of voice intelligence to be transmitted on continuously transmitted positioning intelligence in a dual and interacting closed loop feedback controlled system.

This invention relates to underwater communication systems and particularly to an impoved method and apparatus for effecting electrosonic underwater voice communication.

Conventional electrosonic underwater sonic voice communication systems include "bull-horn" type systems which merely amplify and project the speaker's voice and so-called "wireless" systems employing a sonic carrier modulated by the speaker's voice and reception of which requires processing equipment with amplifying and demodulating capability. Systems of the latter category may be either of the omnidirectional or directional type each of which are possessed of well recognized advantages and disadvantages. Among the advantages of the omnidirectional type systems are a simplicity of the radiating element and its associated transducer system and the ability to communicate with any and all listeners within a roughly spherical volume without regard to spatial locations and included among its disadvantages is the limited range occasioned by inefficient utilization of radiated energy and its essentially non-secure character. In contradistinction thereto, directional systems largely avoid the aforementioned disadvantages attendant omnidirectional systems both as to security and range but do so at the expense of increased problems in transducer alignment which manifests itself both in maintenance of sonic contact and in the reestablishment thereof once contact is broken and also in the necessary diversion of at least part of the available effort of the underwater personnel from the primary tasks of interest to the maintenance of the communication channel.

This invention may be briefly described as an improved method and apparatus for electrosonic underwater voice communication of composite character which broadly includes the tightly integrated utilization of a pair of discrete one way communication channels with complemental receiver tracking of the transmitted carrier for automatic maintenance of mutual alignment. In its more narrow aspects the subject invention includes the utilization of monopulse location techniques with a pair of frequency separated continuous wave beacons with superpositions of the voice intelligence to be transmitted on the continuously transmitted positioning intelligence.

The primary object of this invention is the provision of an improved electrosonic underwater voice communication system.

Another object of this invention is the provision of an improved electrosonic underwater voice communication system that utilizes monopulse location techniques with a pair of discrete one way communication channels and with superposition of the voice intelligence over continuously transmitted positioning intelligence.

Still another object of the invention is the provision of directional, high-gain, electrosonic underwater voice communication apparatus for underwater personnel which will automatically and continuously maintain mutual transducer boresight alignment along a reciprocal bearing line or curve betwen two divers.

A further object of the invention is the provision of a pair of monopulse responsive transducer systems, each carried by a diver and possessing tracking, transmitting and receiving capability through utilization of continuous wave transmission and reception techniques.

Other objects and advantages of the invention will be apparent from the following portions of this specification and from examination of the accompanying drawings which delineate presently preferred constructions and techniques incorporating the principles of this invention and in which like reference numerals designate like parts throughout the figures thereof.

Referring to the drawings.

Figures 4, 6:
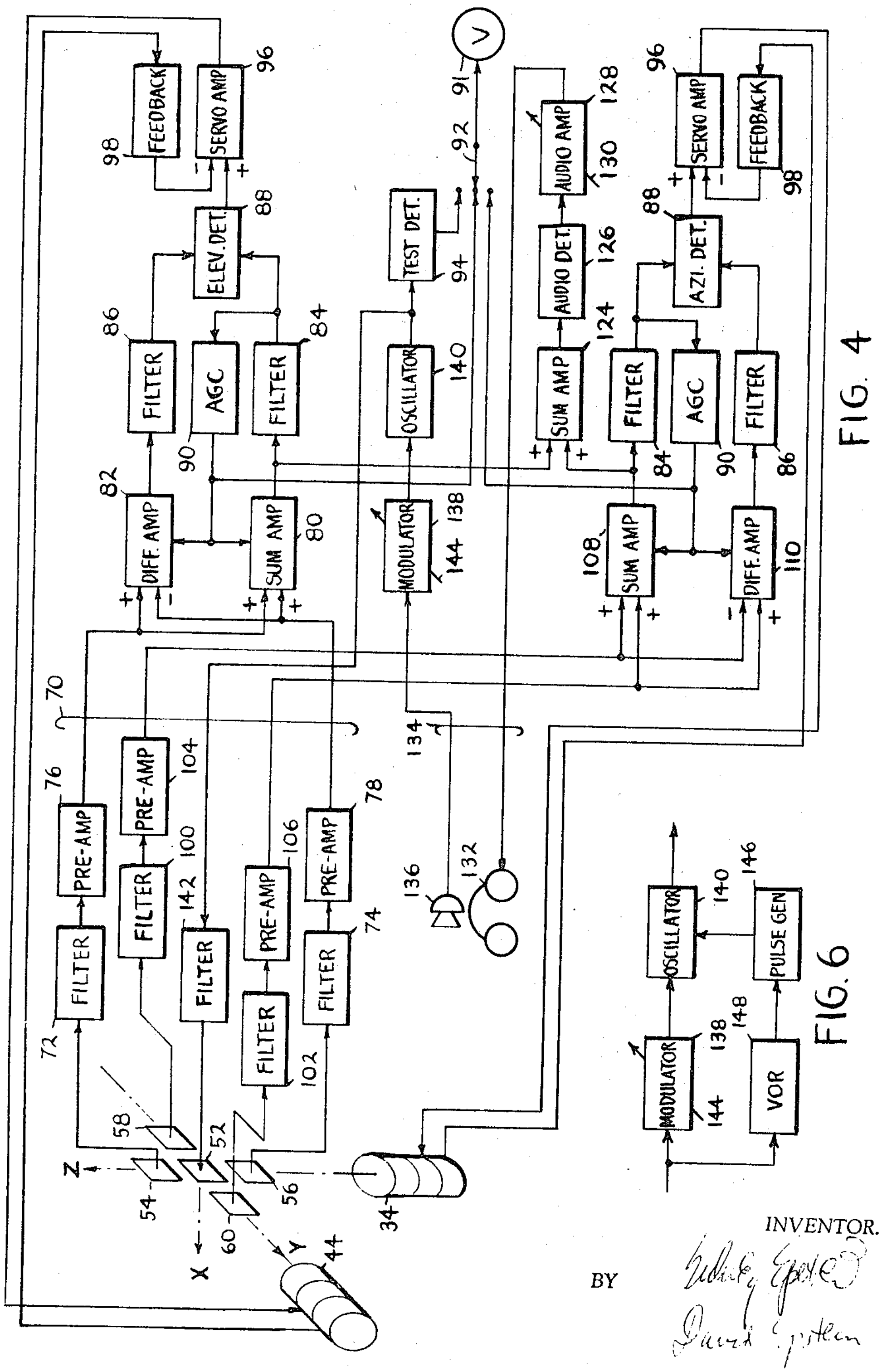
FIGURE 4 is a schematic block diagram of suitable circuit components employable in the practice of the present invention.

FIGURES 5A, 5B, 5C, and 5D depict, in an idealized manner, the electrical filter positive frequency, pass-band characteristics for the filter blocks shown on FIGURE 4; and FIGURE 6 is a schematic block diagram of a modified set of circuit components for inclusion in the circuit of FIGURE 4.

In its broad aspects, the hereinafter described communication system utilizes a pair of highly directive, two plane, amplitude sensing and monopulse responsive antenna assemblies in back to back configuration and while single carrier frequency operation is possible (with uitable time sharing techniques) dual frequency operation is preferred, wherein one station transmits a continuous carrier frequency $f_T$ and receives continually at a second carrier frequency $f_R$ and with the frequency roles reversed at the second station. Thus, each station's receiving sub-system functions to track the other station's transmitting sub-system which in turn is directionally slaved to its direction determining receiver sub-system, to thereby automatically and continuously maintain mutual alignment with the respective transducer boresights being on reciprocal bearings to provide two discrete one-way voice communication channels for use by said divers. Each station transmits and modulates its own transmission carrier frequency and receives via the other's transmission carrier frequency and said carrier frequencies are preferably selected so as to be sufficiently removed to minimize feedback due to transducer leakage and backscatter and so that their modulated spectra are non-overlapping to minimize cross-talk between the two channels.

Tracking and maintenance of transducer boresight alignment is herein effected by utilizing a modified amplitude sensing monopulse technique in conjunction with continuous wave beacons in contradistinction to the low duty cycle, pulse type single station radar type mode of operation heretofore associated with prior monopulse location techniques. The latter techniques are described by D. R. Rhodes in "Introduction to Monopulse," McGraw-Hill, N.Y. (1959), and by Cohen and Steinmetz—Amplitude and Phase-Sensing Monopulse System Parameters, Mircowave Journal, vol. 10, Nos. 10 and 11, October and November 1959. However, in contradistinction to the usual monopulse practice wherein movement of a remote target is tracked from an essentially motionless station (in either a relative or absolute sense) or vice versa, herein each diver (or vehicle) corrects for his (its) own movement or perturbations vis-à-vis a momentarily motionless remote station.

Figure 1:
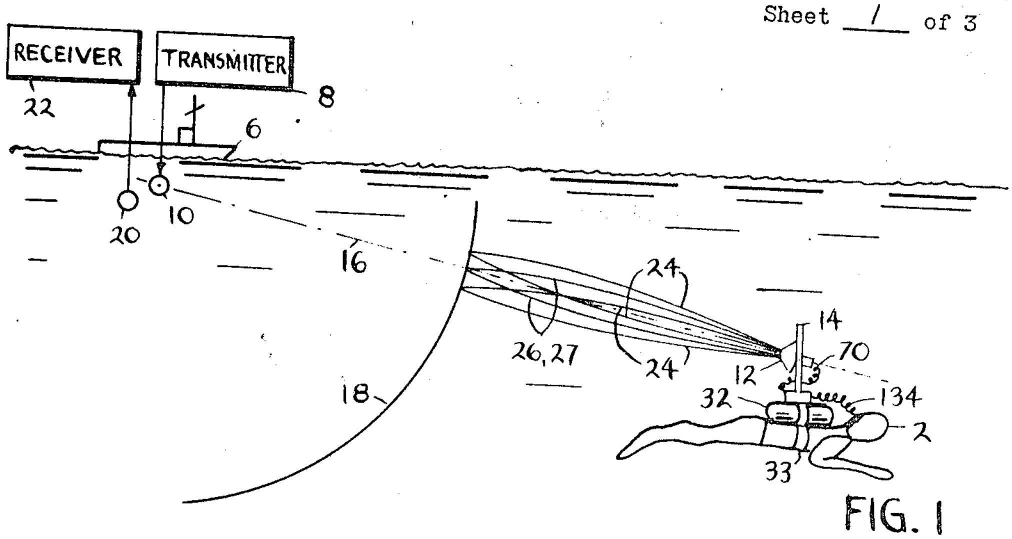
FIGURE 1 is an idealized sketch illustrating a hybrid mode of underwater communication between a vessel and one or more divers incorporating at least some of the principles of this invention.

Referring now to the drawings, FIGURE 1 illustrates a hybrid underwater communication system for sonic communication between a diver 2 and a mother ship 6 incorporating certain of the principles of the subject invention. A mother ship 6 will normally be capable of servicing a multiplicity of divers 2 who conventionally maintain contact with her or with each other via messages relayed to and by the mother ship. As a practical matter, the logistics of such a situation are that the mother ship 6 may, with comparative ease, maintain adequate contact with the divers 2, that is, the mother ship 6 has the capability of providing powerful transmitter and sensitive receiver sub-systems for the enhancement of overall underwater communication system performance.

In operation of the illustrated system, the mother ship (or other master station) 6 generates a continuous carrier frequency, $f_T$, by means of a shipboard sonar-frequency transmitter 8 and radiates a sonic replica thereof in the underwater milieu by means of an omnidirectional transducer 10. The omnidirectional transducer 10 is thus capable of acting as a beacon whose position may be sensed and tracked by electronic or electromechanical means, generally designated 14, suitably comprising a master receiver transducer subassembly and a transmitter subassembly directionally slaved thereto and steered thereby, as for example of the type hereinafter described in conjunction with the transducer assembly illustrated in FIGURES 2 and 2A. Insofar as here pertinent, the diver 2 is provided with a unit 14 which includes servo-controlled tracking transducer assembly 12 having two degrees of freedom (one degree of freedom, i.e. beacon elevation being shown in FIGURE 1) which automatically and continuously aligns its boresight along reciprocal bearing line or cuve 16 toward the omnidirectional radiating source 10.

Voice transmission from the mother station 6 to the diver 2 is effected by suitably modulating the mother station's continuous wave transmission carrier frequency, $f_T$, within transmitter 8 by conventional means.

The line 18 is intended to represent the boundary of the half-power pattern for both the transmitting transducer and the receiving transducer 20 of the mother ship 6. Representative half-power patterns for the diver, receiving transducers are delineated by the boundary lines 24, and the diver's transmission half-power pattern by the boundary line 26. Although, for illustrative purposes, the half-power patterns of the mother station 6 and diver 2 are shown in abutting relation in FIGURE 1, such does not exist as an operational requirement. The receiver half-power patterns 24 shown on FIGURE 1 representing one degree of freedom for beacon elevation-sensing generally delineates the tracking capability of the diver 2 transducer assembly 12. The concomitant second degree of freedom for desired tracking action may be readily visualized by assuming with no loss of generality, that the mother station 6 and the diver 2 lie in a common vertical plane and wherein the diver's azimuth-sensing receiving patterns 27 would now coincide with diver's transmission pattern 26 on a two-dimensional drawing such as here delineated. Of course, when considered in three-dimensions, all of said transducer patterns of the diver's transducer 12 have circular cross-sections.

To effect voice transmission from a diver 2 to the mother station 6, a continuous wave carrier frequency, $f_R$, is suitably modulated and sonically radiated by diver's underwater communication apparatus 14 by way of the beam pattern 26 to mother ship's 6 omnidirectional receiving transducer 20, and thence to shipboard sonic-frequency receiver 22. Because of the omnidirectional character of the mother ship's 6 receiving antenna 20, no transducer alignment problem will there exist and therefore, the diver 2 need only transmit the carrier frequency, $f_R$, and/or the audio sidebands during the actual transmission of a message, with an accompanying conservation of electrical energy.

Figures 2, 2A:
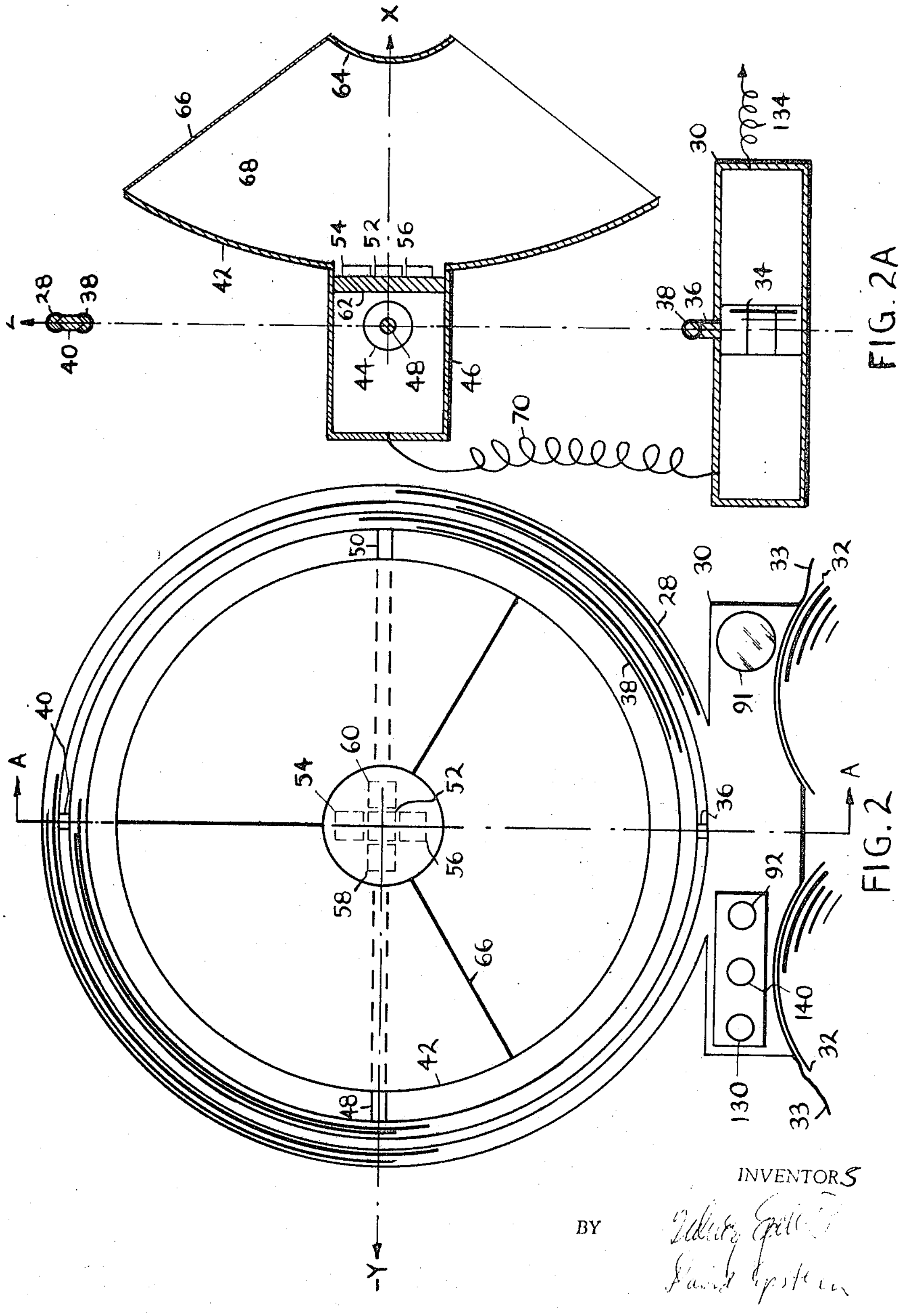
FIGURE 2 is a front view, as taken along the boresight axis, of schematically illustrating a transducer unit and associated components employable in the practice of the subject invention.
FIGURE 2A is a section as taken on the line A—A of FIGURE 2.

FIGURES 2 and 2A illustrate a presently preferred construction for the high-gain directional underwater communication apparatus 14 adapted to be carried by underwater personnel and for the purposes of reference let the transducer boresight axis thereof be denoted by *x*, a second orthogonal axis be denoted by *y* and a third orthogonal axis *z* as shown by the vertical centerline on FIGURE 2A; the three axes forming a right-handed transducer-centered triad.

As illustrated, the subject apparatus 14 includes an outer transducer supporting frame 28 of circular configuration rigidly mounted on a base compartment or housing member 30. The housing member 30 is sized to contain the hereinafter described electronic components, the electrical power supply and the like and its bottom is preferably shaped so as to fit in conforming relation over a skin diver's scuba tanks 32. Straps 33 provided with quick release buckles similar to those used on automobile safety belts may be used to secure the unit to the diver's self-contained air system. Also contained within the housing 30 and disposed in operative engagement with the outer frame 28 is a combined displacement control unit 34, comprising a tachometer and servomotor unit with an associated gearbox and having a geared-down output shaft 36 for transmitting mechanical power, as required, to rotate an inner transducer supporting frame 38 in azimuth and to serve as the lower gimbal therefor. The inner frame 38 is also gimballed as at 40 to the top center of the outer frame 28 so as to be capable of rotation in azimuth about the *z* axis slightly in excess of 360 degrees. Disposed within the inner frame 38 and geared thereto as at 48 and 50 is a paraboloid-shaped, sonic reflector 42 capable of rotation in elevation about the $y$ axis slightly in excess of 360 degrees. Centrally mounted on the reflector 42 is a housing 46 adapted to contain a second displacement control unit 44 comprising a tachometer, servomotor and associated gearbox. The housing 46 also serves to support a backing plate 62 disposed adjacent to the reflector surface. Mechanical power for effecting desired rotative displacement of said reflector 42 in elevation is supplied from the servomotor components of the second displacement control unit 44 through the geared mountings 48 and 50. Because of the integral mounting of the control unit 44 on the reflector 42, the geared-down shafts 48 and 50 function to transmit "elevation" torque to the reflector and act as a gimbal mounting for the reflector on the inner frame 38. As will now be apparent, the transducer assembly 12 incorporates two degrees of freedom, one in azimuth and one in elevation.

Because the transducer reflector 42 and appendages thereto must be free to rotate within inner frame 38, the Cassegrain antenna principle described by M. I. Skolnick in "Introduction to Radar Systems," McGraw-Hill, New York, 1962, on pages 282–286, may be here used to advantage. With other considerations being equal, the illustrated paraboloid reflector configuration tends to shorten the $x$ axis dimension of the transducer assembly 12.

Mounted on the backing plate 62 at the junction of the trial apex is a sonic transmitting transducer 52. Disposed adjacent thereto are two pairs of receiving transducers, i.e., an elevation sensing pair 54, 56 and an azimuth sensing pair 58, 60, positioned so that the phase centers of their radiating faces are located at the real focal points, in the vicinity of the vertex of the paraboloid reflector 42 of the Cassegrain antenna reflector assembly. A hyperboloid sub-reflector 64 is included in the reflector assembly and is located in front of the paraboloid reflector 42 between the vertex and the focus thereof. With the above described construction, the resulting transmission transducer radiation pattern 26 is centered on the boresight axis $x$ and the receiving transducer patterns (for example, the illustrated elevation-sensing transducer patterns 24) are "squinted" off the boresight axis by predetermined amounts.

The sub-reflector 64 is preferably supported by a plurality of thin rigid struts 66 from the periphery of the reflector and a thin protective watertight lining 67, such as a rho-rubber membrane, may be stretched there over from the rim of reflector 42 to the rim of sub-reflector 64. The thus enclosed volume 68 may be filled with a non-conducting liquid, such as castor oil, so as to improve the sonic impedance match between sonic transducers and the surrounding water milieu.

As previously mentioned, the transmitting transducer 52 is centered on the boresight axis, the pair of elevation-sensing receiving transducers 54 and 56 are preferably positioned above and below the transmitting transducer 52 on the $z$ axis, and the pair of azimuth-sensing transducers 58 and 60 are preferably positioned on either side of the transmitting transducer 52 on the $y$ axis with the transducer cluster thus forming a cruciform shaped receptor system. The low-level, front-end electronic elements located in housing 46 and connected to the receiving transducer pairs are suitably shielded from stray electromagnetic fields emanating from the co-occupant electromechanical displacement control unit 44 and from high-level electronic transmission elements associated with the transmitting transducer. The electrical signal and power connections for the various components located within the housing 46, suitably shielded and of a watertight nature, are interconnected with base compartment components 30 via a cable 70 which includes sufficient slack to allow for normal movement of the transducer assembly 12.

Figure 3:
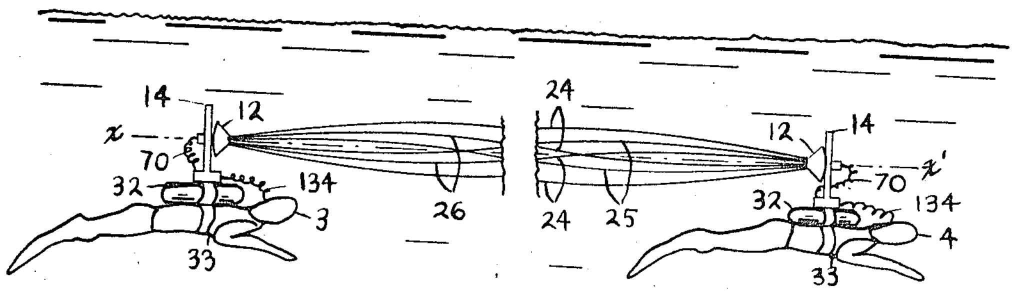
FIGURE 3 is an idealized sketch illustrating the directional mode of underwater communication between two divers in accord with the principles of this invention and with each equipped with transducer systems as shown in FIGURES 2 and 2A.

FIGURE 3 illustrates the incorporation of the principles of this invention in a high-gain, directional communication link between two scuba divers 3 and 4 in a representative underwater situation wherein they must be able to maintain continuous mutual communication. As heretofore described, the diver 3 will transmit a continuous carrier wave at a frequency $f_T$ for reception by the receiving apparatus of diver 4 and conversely, diver 4 will transmit a continuous carrier wave at a frequency $f_R$ for reception by the receiving apparatus of diver 3. The transmission beam 26 emanating from the transducer system 14 of diver 3 is centered about his boresight axis $x$ which in turn lies on the reciprocal bearing line 16. This transmission beam 26 acts as an active continuous wave beacon for the quadruple beam (i.e., beams 24 and 25) transducer receiving system of diver 4 which is squinted about latter's boresight axis $x$ and both boresight axes, $x$ and $x'$, are constrained by their respective but interlocking servo systems to consider the reciprocal bearing line 16 as their perturbation-mean position.

As will now be apparent, if we consider diver 3 (with his coordinate axes $x$, $y$ and $z$) and diver 4 (with his coordinate axes $x'$, $y'$ and $z'$) as located in the position shown on FIGURE 3, it is apparent that axes $x$, $x'$, $z$, and $z'$ then define a given vertical plane and axes $x$, $x'$, $y$, and $y'$ define a given horizontal plane thereon. As the mutual positions of the divers change, these planes may be warped in space about the reciprocal bearing line ($x$, $x'$) 16 without affecting the mutual tracking capability of system because of the cylindrical symmetry of transmitting and receiving beam configuration. Therefore, the terms "elevation-sensing" and "azimuth-sensing" are convenient relative terms usable herein for expository purposes.

In order to illustrate the operations wherein mutual boresight alignment is continuously maintained, let it be assumed that diver 4 moves such that a pitch angle about his $y'$ axis develops; thus resulting in a change in the elevation angle on FIGURE 3. Such movement will cause his boresight axis, $x'$, to rotate in the plane of the drawing and such movement would be sensed and detected by his elevation-sensing receiving transducer beams 24. Thus one of said elevation-sensing receiving transducers would enjoy an increase in signal strength from the displacement of transmission beam 26 from diver 3 and the other of said elevation sensing receiving transducers would suffer a concomitant decrease in signal strength. In a manner to be hereinafter described later, such sensed changes in signal level or strength are operated upon in the elevation-sensing channel of the controlment of subject invention 14 and the transducer assembly 12 is servo-operated so as to reduce said change in pitch angle to zero and thus function to restore the diver 4 boresight axis $x'$, to its former position along reciprocal bearing line 16.

In a similar fashion, a movement of the diver 4 which would function to generate a change in yaw angle about the $z'$ axis would result in a change in azimuth angle on FIGURE 3. Such would cause his boresight axis $x'$ to tend to rotate in a plane orthogonal to the drawing and would be detected by his receiving transducers 58 and 60 and corrected by the azimuth sensing channel in the receiving system of driver 4.

Because of the aforementioned circular cross-sectional symmetry of the transmission beam pattern 26 from the diver 3, it will now be apparent that a motion of diver 4 which would generate an angle in roll about the boresight axis $x'$ does not operate to affect the reciprocal bearing alignment between $x'$ and $x$ and hence, no realignment to compensate for such roll is necessary.

As will be apparent, the foregoing description pertains equally well for movements of diver 3 vis-à-vis transmission bear 25 from diver 4 which combine to provide a mutuality of response which automatically and continuously maintains alignment between a pair of divers irrespective of their individual movements.

FIGURE 4 is a schematic block diagram illustrating the interrelationship of essential components included in and the electro-mechanical operations performed thereby in the presently preferred embodiment of the underwater communication apparatus 14. For example, electrical replicas of the sonic signals received by the elevation-sensing transducers 54 and 56 are selectively fed to band-pass filters 72 and 74 which operate to pass the received carrier frequency plus attendant non-overlapping servo and audio sidebands. For simplicity, conventional amplitude-modulated, double-sideband transmission will be herein described in connection with the illustrated presently preferred embodiment and an idealized representation of the desired response characteristics of filters 72 and 74 are shown on FIGURE 5A. The servo sidebands result from the relative motion between the local and remote boresights, with frequency band-pass as shown on FIGURE 5B. The audio sidebands result from voice transmissions superimposed on the carrier wave by remote diver. The composite, filtered signals from said filters 72 and 74 are fed through pre-amplifiers 76 and 78 and to difference amplifier 82 and sum amplifier 80 via cable 70. The outputs of the sum and difference amplifiers 80 and 82 are fed to band pass filters 84 and 86, respectively, which operate to pass the up-converted servo bandwidth frequencies, as shown on FIGURE 5B. The sum and difference outputs of said band pass filters 84 and 86, stripped of audio frequencies, are then conjointly fed to the elevation detector 88, convenient in the nature of a phase sensitive demodulator, which provides a signed output signal whose magnitude is proportional (within limits set by transducer beamwidths) to the elevation-component of the angular deviation between the incoming (remote) signal boresight and diver's (local) boresight, and whose sense indicates the direction of said component of angular deviation. The elevation detector 88 output servo bandwidth, suitably down-coverted to zero frequency, is delineated by dashed lines on FIGURE 5C. Amplitude normalization of the input signals to the elevation detector 88 is effected by means of an automatic gain control (AGC) circuit 90 whose smoothed output tends to maintain said detector's inputs at the proper operating level. Such is effected by sensing the output of the sum channel from filter 84, and feeding back a bias signal to control the gains of the sum 80 and difference 82 amplifiers.

The aforementioned transducer boresight elevation positional error signal output from the elevation detector 88 is fed to the plus input of a servo amplifier 96. Transducer assembly 12 elevation angular velocity feedback is obtained from the tachometer section of the second displacement control unit 44 and such is fed to the minus input of the servo amplifier 96 via cable 70 and feedback shaping network 98. The output of the servo amplifier 96 is then introduced into the servomotor section of said displacement control unit 44, and the geared down mechanical output thereof rotates transducer assembly 12 through required elevation angle, to re-align the elevation-component of the local transducer boresight along the reciprocal bearing line 16 in accordance with well-known closed loop servo principles.

In order to re-align the local transducer boresight coaxially with reciprocal bearing line 16, the component of positional error in azimuth must also be reduced to zero. As above described, electrical replicas of the remote transmitted sonic signal are received locally by the azimuth-sensing transducers 58 and 60 and fed to the band-pass filters 100 and 102, which may be identical to filters 72 and 74. The outputs of the band-pass filters 100 and 102 are fed through pre-amplifiers 104 and 106 and are applied to the inputs of sum amplifier 108 and difference amplifier 110 via cables 70. As will now be apparent, all components of the azimuth-sensing and correcting channel are essentially identical to those included in and heretofore described in conjunction with the elevation-sensing and correcting channel and the foregoing description is equally applicable thereto. Further, although herein described separately and in sequence, transducer re-alignment in both elevation and azimuth takes place both simultaneously and continuously.

Because of the inverse correlation that normally exists between the magnitude of such AGC bias voltage and the distance between the parties communicant, the bias voltage may be used to give the local diver a rough indication of relative distance between himself and the remote communicant to provide means of warning him of the onset or approach of maximum permissible operative tracking radius. To incorporate this feature, a multipurpose, test voltmeters having a scale 91, calibrated in units of range is included in the system. Such calibration may be effected for a given system in terms of known transmitter signal strength capability, the attenuation characteristics of transmission medium, and the local receiver parameters. In operation of such a unit, the diver selects said feature by manipulating the voltmeter test function selector switch 92, which allows him two independent range measurements by sampling and comparison of the sum outputs of either elevation or azimuth channels. Observed discrepancies between expected and/or observed range measurements serve to give the diver an indication as to the condition of the receiving equipment and/or the condition of the sound channel. Incorporation of such a test channel also permits checking of diver's transmission equipment through sampling of the transmitter output and signal strength by test detector 94 through test switch 92. The diver may obtain an indication of relative bearing between himself and remote communicant simply by observing the orientation of his antenna assembly. This feature in conjunction with the aforementioned relative distance indicator serves to give the diver a rudimentary navigational capability in that he has the ability to ascertain the relative distance vector intermediate himself and a remote station.

For voice reception purposes, the outputs of the sum amplifiers 80 and 108, respectively, of both the elevation and azimuth channels are fed to a summing amplifier 124 and thence to an audio detector 126. The output of the audio detector 126 is fed to the input of an audio amplifier 128, the magnitude of whose output is controlled by a manual gain control 130 and whose band-pass frequency characteristics are delineated by the solid lines on FIGURE 5C. The output of the audio amplifier 128 is applied to the diver's earphones 132 by means of a cable 134.

Figure 5A:
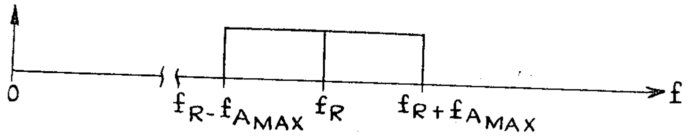
Figure 5B:
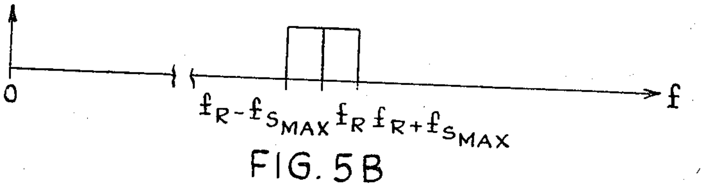
Figure 5C:
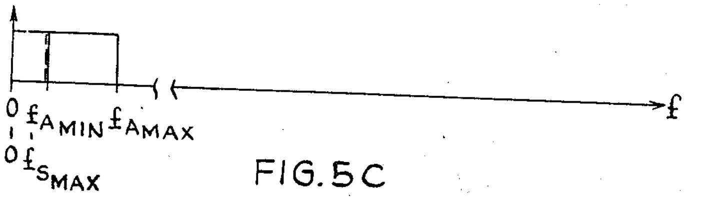
Figure 5D:
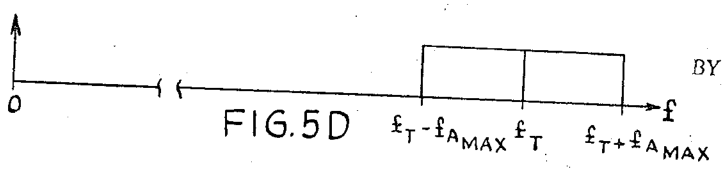

In order to transmit a message, the diver's voice actuates a suitable microphone 136 which in turn actuates a modulator 138 whose band-pass frequency characteristics are delineated by the solid lines on FIGURE 5C. The modulator 138 modulates the continuous carrier wave output of an electronic oscillator 140 in the usual manner. The output of the oscillator, whether modulated or unmodulated, is fed through an impedance matching band-pass filter 142 and the transmission energy, having a frequency band-pass characteristic as shown on FIGURE 5D, is applied to transmitting transducer 52 for conversion into sonic energy.

A suitable modulation index of voice modulated transmissions may be effected by means of the manual gain control 144. It is also desirable to provide the microphone/earphone cable 134 with sufficient slack so as to allow diver to remove underwater communication apparatus 14 from his person, deposit it on the bottom of the water or otherwise anchor it in a convenient position in his vicinity, preparatory to entering a sonically screened area and/or performing work, as required.

If desired, and with some increase in equipment complexity, the 100% duty cycle presently preferred and above described of the transmitted continuous wave signal may be lowered in order to conserve each diver's electrical power supply, particularly during the time that said continuous wave carrier is utilized for antenna realignment purposes only. Such a reduction in duty cycle may be effected in accordance with well known information sampling theorems and pulse modulation techniques, subject to the constraints imposed by the mutual dynamics of the divers and the servoed response characteristics of subject apparatus 14.

Electrical power expenditure in the servo loops may also be conserved by means of sample-data techniques. Insofar as the transmitted signals alone are concerned, pulsing either allows electrical energy to be conserved or to be re-distributed so as to generate stronger signals of shorter duration with the same available average power.

Since the highest audio frequency, $f_{A_{max}}$, is desirably at least one order of magnitude higher than the highest servo frequency, $f_{S_{max}}$, a dual sampling frequency rate is desirable. For the described continuous alignment transmission mode, such a lower sampling rate would be employed only to be over-ridden by the higher sampling rate during the intermittent (but concurrent) communication transmission mode.

Such desired pulsing may be automatically effected as shown on FIGURE 6. As there illustrated, a dual rate pulse generator 146 emits a continuous, uniform, train of pulses at some rate $\geqq 2f_{S_{max}}$ to pulse a high level power amplifier component of oscillator 140. The amplitudes of the resulting pulse bursts may be visualized by sampling the normal, unmodulated, continuous carrier frequency output. In the frequency domain, the transmission frequency spectrum will now have a $(\sin x)/x$ distribution centered about the continuous carrier frequency, $f_T$, spectral line. When a diver speaks, the voice energy from the microphone 136 senses to energize the voice operated relay 148 which in turn triggers the dual rate pulse generator 146 to output a uniform train of pulses at some rate $\geqq 2f_{A_{max}}$. The amplitudes of the resulting voice modulated pulses may be visualized by sampling the normal, double side band, amplitude modulated output. Higher order modulation spectra, introduced by the sampling process, will be rejected by the transmission filter 142.

By disabling receiving transducer 54, 56, 58 and 60 outputs during the periods when the transmitting transducer 52 is being pulsed or using receiving transducers to transmit, in accordance with well known transmit/receive duplexer techniques, a single carrier frequency system operation obtains, e.g., FIGURE 5D is no longer used. Instead, the time intermediate transmission bursts is utilized for reception purposes. If the timing of the dual rate pulse generator 146, in the tracking mode, is closely maintained frequency-wise and pre-synchronized with other communicant's pulse generator prior to an underwater mission, a more accurate determination of relative distance between communicants obtains. This is accomplished by continually and automatically updating a differential count between locally generated and remotely generated pulses. Accuracy may be further enhanced by measuring time intermediate most recent local and remote pulse arrivals and using this information as a vernier adjustment. Since design time intervals intermediate pulses in a given pulse train and the velocity of sound in water are both known a priori, time measuring indicator 91 is readily calibrated in units of distance as before.

The usage of a uniform pulse rate facilitates distance measurement but it may lead to "blind spots" at certain distances separating the divers 3 and 4, i.e., receiving transducer channels of the diver 3 apparatus may be in the disabled state at the time that transmission burst from diver 4 apparatus arrives or vice versa. To circumvent this difficulty, the sequence of events for pulsed single-carrier frequency is made the same as that for the pulsed dual-carrier frequency operation previously described, except that the dual sampling frequency generator 146 is now constituted to generate random pulse trains. As before, whether the average sample rate is some average rate $\geqq f_{A_{max}}$ or $\geqq f_{S_{max}}$ will be determined by the state of the voice operated relay 148. The resulting random occurrence of individual pulses of energy effectively precludes system blind spots yet the random trains provide sufficient independent samples so as to allow receiving equipment to reconstitute received audio and/or servo information. As will be apparent, the foregoing particularly pertains to the use of the subject invention to provide underwater communication in the directional mode of operation. When said apparatus is to be used in the hybrid, dual carrier frequence continuous wave mode of operation, as previously described in conjunction with FIGURE 1, a modification of the transmission channel to conserve diver's electrical energy is desirably incorporated into the system. In such a unit the actuation of the microphone 136 or a voice actuated relay 148 serves to effect actuation of both the modulator 138 and the oscillator 140. With such a modification and while the microphone is actuated as by incorporation of a suitable switching time constant contained in the voice operated relay, the oscillator 140 will remain activated through any short pauses between spoken words and cessation of diver's conversation will serve to automatically deactivate the oscillator 140.

The subject invention may also use laser beams, with operating frequencies in the blue-green low attenuation "window" which exists in the water milieu, in lieu of sonic beams. Because the laser frequencies are many orders of magnitude greater than the sonic frequencies, a considerable reduction in transducer assembly size may be realized.

Having thus described our invention, we claim:

1. In an underwater communication system directionally selective transducer means adapted to be supported on a multi-directionally displaceable object in an underwater milieu, means associated with said transducer means and responsive to a remotely emitted carrier wave of preselected nominal frequency for maintaining the boresight of said transducer means on a reciprocal bearing axis with the source of said remotely emitted carrier wave, means for transmitting intelligence back to the source of said remotely emitted carrier wave along said reciprocal bearing axis through said transducer means, said means for transmitting intelligence back to the source of said remotely emitted carrier wave comprising means for generating a second carrier wave of the same frequency as that of the remotely emitted wave and auxiliary means for effecting operational time sharing with said remotely emitted wave to provide dual communication channels operating at the same frequency.

2. In a method of underwater communication the steps of directionally slaving a first signal transmission beacon along a first boresight from a first movable location in response to receipt of a second signal transmission beacon along a second boresight through a selectively aligned displaceable second master receiver at said first movable location, selectively aligning a tridimensionally displaceable first master directional receiver movably disposed at a second and remote location on said first boresight to establish said second boresight alignment therebetween, directionally slaving a second signal transmission beacon along said second boresight from said second location and through said directionally aligned first master receiver toward the source of said first signal transmission beacon at said first location, selectively aligning said second displaceable master directional receiver movably disposed at said first location on said second boresight to establish dual and mutual coincident boresight alignment on reciprocal bearings between said first and second locations and conveying intelligence over said first and second signal transmission beacons.

3. The method as set forth in claim 2 including the steps of continuously maintaining said first receiver aligned on said first signal transmission beacon and continuously maintaining said second receiver aligned on said second signal transmission beacon.

4. The method as set forth in claim 3 including the step of directionally transmitting said first signal transmission beacon through said directionally aligned second receiver.

References Cited

UNITED STATES PATENTS

| | | | |
|---|---|---|---|
| 2,140,130 | 12/1938 | Earp. | |
| 3,130,385 | 4/1964 | Galloway | 340—6 |
| 3,181,116 | 4/1965 | Gordon. | |

OTHER REFERENCES

Trefethen et al., Electronics, Apr. 1, 1957, pp. 156–160.

RICHARD A. FARLEY, *Primary Examiner.*

U.S. Cl. X.R.

340—6; 343—100, 117